(12) United States Patent
Drum et al.

(10) Patent No.: US 8,485,289 B2
(45) Date of Patent: Jul. 16, 2013

(54) AIR PRESSURE REGULATED AXLE SUMP

(75) Inventors: Carolyn Lambka Drum, Dubuque, IA (US); Mark J. Besler, Dubuque, IA (US); Christopher M. Ruden, Peosta, IA (US); Jonathan A. Dylhoff, Dubuque, IA (US); Gary R. Fichtinger, Hazel Green, WI (US); Michael J. Ackerman, Peosta, IA (US); Jeffrey S. Turner, Coffeyville, KS (US)

(73) Assignee: Deere & Company, Moline, IL (US)

( * ) Notice: Subject to any disclaimer, the term of this patent is extended or adjusted under 35 U.S.C. 154(b) by 365 days.

(21) Appl. No.: 13/033,919

(22) Filed: Feb. 24, 2011

(65) Prior Publication Data

US 2012/0217073 A1 Aug. 30, 2012

(51) Int. Cl.
*B60K 1/02* (2006.01)
(52) U.S. Cl.
USPC .......................................... 180/62; 180/65.51
(58) Field of Classification Search
USPC ...... 180/65.51, 65.6, 56, 58, 60, 62; 475/150; 477/7; 184/6
See application file for complete search history.

(56) References Cited

U.S. PATENT DOCUMENTS

| 5,440,951 | A | * | 8/1995 | Okada et al. ................. 74/606 R |
| 5,515,747 | A | * | 5/1996 | Okada et al. ................. 74/606 R |
| 6,263,664 | B1 | * | 7/2001 | Tanigawa et al. ............. 60/39.54 |
| 6,651,762 | B1 | * | 11/2003 | Hokanson et al. ......... 180/65.51 |
| 7,445,574 | B2 | * | 11/2008 | Weith ............................. 475/160 |
| 8,056,662 | B2 | * | 11/2011 | Schoon et al. ................. 180/65.6 |
| 2002/0134597 | A1 | * | 9/2002 | Mann et al. .................. 180/65.5 |
| 2007/0149339 | A1 | * | 6/2007 | Weith ............................. 475/160 |
| 2008/0182712 | A1 | * | 7/2008 | Kira et al. .......................... 477/7 |
| 2008/0230289 | A1 | * | 9/2008 | Schoon et al. ................ 180/65.6 |
| 2011/0065544 | A1 | * | 3/2011 | Millar ............................... 475/86 |
| 2013/0056289 | A1 | * | 3/2013 | Shibukawa et al. ............. 180/62 |

* cited by examiner

*Primary Examiner* — John Walters
*Assistant Examiner* — James Triggs
(74) *Attorney, Agent, or Firm* — Stephen F. Rost; Taft, Stettinius & Hollister LLP

(57) ABSTRACT

A method and associated apparatus for controlling fluid levels within an axle tube, the method comprising: (a) establishing a first predetermined level of a liquid lubricant within a transmission and an electric motor operatively coupled to the electric motor, the axle tube housing the electric motor and the transmission, where a cavity interposing a wall of the axle tube and the electric motor is occupied by the liquid lubricant reservoir at a second predetermined level; and, (b) lowering the first predetermined level of a liquid lubricant within the electric motor and the transmission by changing a gas pressure exerted upon the liquid lubricant, where changing the gas pressure exerted upon the liquid lubricant within the axle tube raises the second predetermined level of liquid lubricant within the cavity.

20 Claims, 16 Drawing Sheets

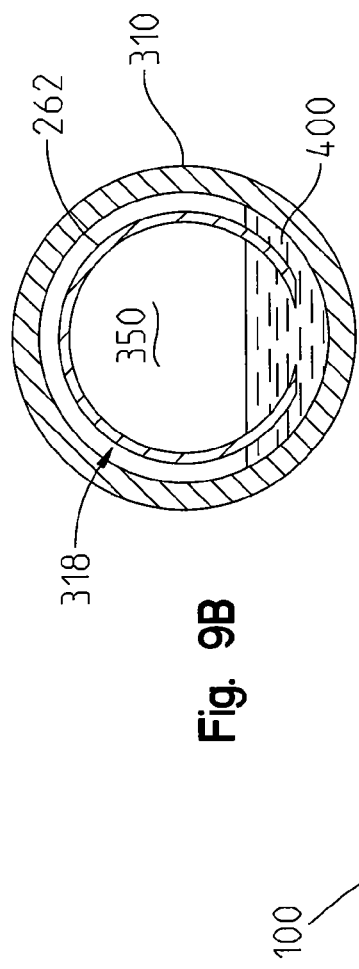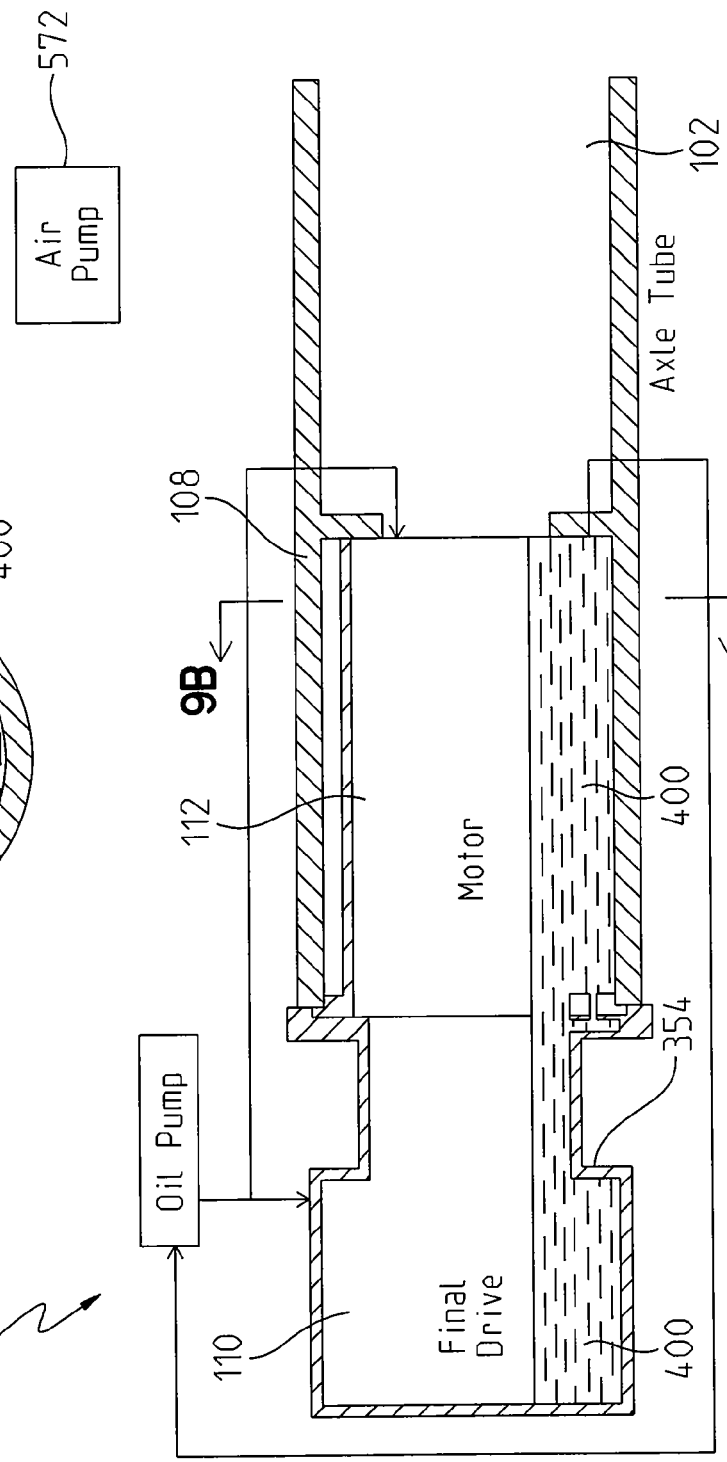
Fig. 9B
Fig. 9A

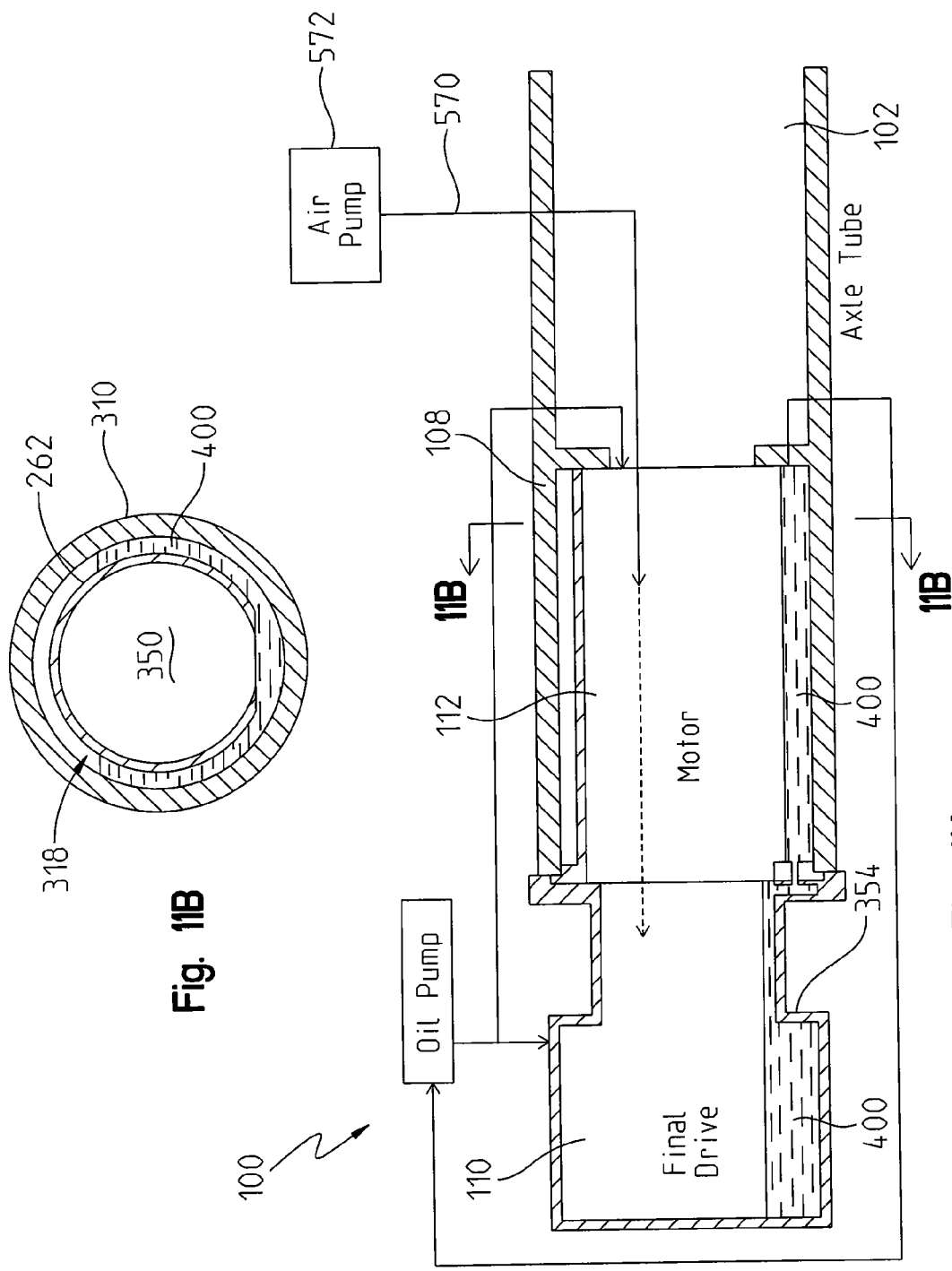

AIR PRESSURE REGULATED AXLE SUMP

FIELD OF THE INVENTION

The present disclosure relates to managing an oil level in an axle or axle tube.

BACKGROUND OF THE INVENTION

Oil is used as a lubricant and coolant for the components in an axle or axle tube. This coolant prevents over-heating and operates to increase the life of the components within the axle. More oil provides a larger volume to remove heat, however, it is desirable to maintain a low level of oil in rotating axle components to reduce windage loss.

A separate sump volume for holding a larger volume of oil adds cost to the vehicle and potentially requires additional pumps to move the oil to this alternate location. The additional sump would also use space on the vehicle either making service more difficult to other components, or increasing the overall size of the vehicle.

SUMMARY

The exemplary embodiments of the present disclosure include axle tubes and components for managing the level of lubricant within the axle tube.

In exemplar form, there are four components that are lubricant cooled within a single axle tube. These components are two final drives (located at each end of the axle tube and referred to in the detailed description as the transmission subsections) and two motors (referred to in the detailed description as the motor subsections), located inside each end of the axle tube, and connected to the final drives.

There are multiple desired lubricant levels within the axle tube. The ideal lubricant level inside the final drives is a few inches below centerline. The motors, however, will operate best if all lubricant fed into the motor is evacuated so that the motor does not contain any standing lubricant.

Balancing the lowest level of lubricant that may be used in the final drives with the intent to reduce the lubricant level within the motors, the instant disclosure provides an alternate area as a sump or reservoir to maintain the volume of lubricant required for adequate lubricant circulation. In exemplary form, the annulus of empty space between the motor housing and the axle tube is used as the sump volume. This uses existing features and empty space on the axle tube, thereby eliminating addition of a separate sump.

In exemplary form, a single drain hole is placed at the bottom of the motor. Additional drain holes are placed to allow lubricant to flow from the final drive into the axle tube, directly into the annulus surrounding the motor. In this exemplary configuration, these holes are through the motor mounting plate, but outside of the motor housing. The final drive is designed internally to trap lubricant in the planetary reduction where a higher level of lubricant is desired. This may be accomplished by blocking any path to the drain holes lower than a predetermined point below centerline.

In order to gain the desired volume of lubricant in the sump, air pressure is supplied to the motor to create a pressure differential allowing a higher lubricant level in the annulus surrounding the motor, while keeping the level in the motor low. The air pressure can either be supplied by a standalone air pump or can be taken from a turbocharger of an engine. A hole is punched through the mount plate of the motor to connect the inside of the motor housing to the final drive. This allows air to flow into the final drive. A breather is connected to the wet sections of the axle tube to maintain minimal back pressure on the lubricant in the sump/annulus. This difference in pressure from within the motor/final drive to the wet axle tube will drive a higher level within the axle tube and a lower level in the motor and final drive.

The exemplary embodiments allows for a single lubricant system to be shared between the motor and final drive. The air pressure and the internal design of the final drive the system is able to self-regulate different lubricant levels inside of the two components in order to use a common sump to satisfy the lubricant needs of both the motor and final drive.

It is a first aspect of the present disclosure to provide an axle tube comprising: (a) a transmission subsection housing a transmission; (b) an electric motor having an outer housing, the electric motor at least partially encompassed by a motor tube to comprise a motor subsection, the outer housing having a drain orifice; and, (c) a liquid cavity cooperatively delineated by the outer housing and the motor tube, the liquid cavity, where the liquid cavity and an interior of the electric motor are in fluid communication via the drain orifice, where the transmission subsection and the motor subsection are mounted to one another, where the transmission subsection fluidicly communicates with the interior of the electric motor through a first orifice, where the transmission subsection fluidicly communicates with the interior of the electric motor and liquid cavity through a second orifice and, where the first Orifice is elevated above the second orifice.

In a more detailed embodiment of the first aspect, the electric motor includes an air inlet orifice in communication with the interior of the electric motor and, the motor subsection includes a lubricant inlet orifice in communication with an interior of the motor subsection. In yet another more detailed embodiment, at least one of the transmission subsection and the motor subsection includes a drain orifice in fluid communication with a pump by way of a first conduit to draw out liquid and, at least one of the transmission subsection and the motor subsection includes a liquid inlet orifice in fluid communication with the pump by way of a second conduit to deliver liquid to at least one of the transmission subsection and the motor subsection. In a further detailed embodiment, the second conduit is in fluid communication with an in-line liquid filter and, the second conduit is in fluid communication with an in-line liquid radiator. In still a further detailed embodiment, the second conduit is in fluid communication with a liquid manifold, the liquid manifold divides the second conduit into a first inlet line and a second inlet line, the first inlet line is in fluid communication with an interior of the transmission subsection and, the second inlet line is in fluid communication with an interior of the motor subsection. In a more detailed embodiment, the motor subsection includes an end plate having an opening through which a motor shaft of the electric motor extends into the transmission subsection, the end plate including the first orifice and the second orifice, the first orifice is located above the opening and the second orifice is located below the opening.

It is a second aspect of the present invention to provide an axle tube comprising: (a) a right side transmission subsection housing a right side transmission; (b) a left side transmission subsection housing a left side transmission; (c) a right side electric motor having a right side outer housing, the right side electric motor at least partially encompassed by a motor tube to comprise a motor subsection, the right side outer housing having a first drain orifice; (d) a left side electric motor having a left side outer housing, the left side electric motor at least partially encompassed by the motor tube to comprise part of the motor subsection, the left side outer housing having a second drain orifice; and, (e) a liquid cavity cooperatively delineated by the right side outer housing, the left side outer housing, and the motor tube, where the liquid cavity and an interior of the right side electric motor are in fluid communication via the first drain orifice, where the liquid cavity and an interior of the left side electric motor are in fluid communication via the second drain orifice, where the right side transmission subsection and the motor subsection are mounted to one another, where the left side transmission subsection and the motor subsection are mounted to one another, where the right side transmission subsection fluidicly communicates with the interior of the right side electric motor through a first opening, where the right side transmission subsection fluidicly communicates with the interior of the right side electric motor and the liquid cavity through a second opening, where the left side transmission subsection fluidicly communicates with the interior of the left side electric motor through a third opening, where the left side transmission subsection fluidicly communicates with the interior of the left side electric motor and the liquid cavity through a fourth opening and, where the first and third openings are respectively elevated above the second and fourth openings.

In a more detailed embodiment of the second aspect, the right side electric motor includes an air inlet orifice in communication with the interior of the right side electric motor, the right side motor subsection includes a lubricant inlet orifice in communication with an interior of the right side motor subsection, the left side electric motor includes an air inlet orifice in communication with the interior of the left side electric motor and, the left side motor subsection includes a lubricant inlet orifice in communication with an interior of the left side motor subsection. In yet another more detailed embodiment, the right side motor subsection includes an end plate having an opening through which a motor shaft of the right side electric motor extends into the right side transmission subsection, the end plate including the first orifice and the second orifice, the first orifice is located above the opening and the second orifice is located below the opening and, the left side motor subsection includes an end plate having an opening through which a motor shaft of the left side electric motor extends into the left side transmission subsection, the end plate including the third orifice and the fourth orifice, the third orifice is located above the opening and the fourth orifice is located below the opening.

It is a third aspect of the present invention to provide a method of controlling fluid levels within an axle tube, the method comprising: (a) establishing a first predetermined level of a liquid lubricant within a transmission and an electric motor operatively coupled to the electric motor, the axle tube housing the electric motor and the transmission, where a cavity interposing a wall of the axle tube and the electric motor is occupied by the liquid lubricant reservoir at a second predetermined level; and, (b) lowering the first predetermined level of a liquid lubricant within the electric motor and the transmission by changing a gas pressure exerted upon the liquid lubricant, where changing the gas pressure exerted upon the liquid lubricant within the axle tube raises the second predetermined level of liquid lubricant within the cavity.

In a more detailed embodiment of the third aspect, the act of changing the gas pressure exerted upon the liquid lubricant includes forcing compressed air into the axle tube the compressed air coming from a discharge of a turbocharger. In yet another more detailed embodiment, the act of changing the gas pressure exerted upon the liquid lubricant includes forcing air into the axle tube using an air compressor. In a further detailed embodiment, the act of changing the gas pressure exerted upon the liquid lubricant includes applying suction to the cavity. In still a further detailed embodiment, the first predetermined level of the liquid lubricant is different within the transmission and the electric motor. In a more detailed embodiment, the transmission and an interior of the electric motor are in gaseous communication with one another through a first opening, the transmission and the cavity are in liquid communication with one another through a second opening and, the first predetermined level of a liquid lubricant within the electric motor prohibits gases communication between the interior of the transmission and the cavity.

It is a fourth aspect of the present invention to provide a method of distributing a liquid lubricant within an axle tube, the method comprising: (a) using a cavity interposing an electric motor and a wall of the axle tube as a liquid lubricant reservoir, where the axle tube houses the electric motor and a transmission; and, (b) varying the amount of liquid lubricant within the reservoir by changing a pressure of a gas in communication with the liquid lubricant in the axle tube.

In a more detailed embodiment of the fourth aspect, the method further includes (c) providing a predetermined amount of the liquid lubricant within the axle tube, (d) maintaining the predetermined amount of the liquid lubricant within the axle tube and, (e) dropping a level of liquid lubricant in at least one of the electric motor and the transmission, where varying the amount of liquid lubricant within the reservoir does not change the predetermined amount of the liquid lubricant within the axle tube. In yet another more detailed embodiment, the axle tube includes a second cavity interposing a second electric motor and the wall of the axle tube as a second liquid lubricant reservoir and, the axle tube houses the second electric motor and a second transmission. In a further detailed embodiment, the axle tube includes a dry section between the electric motor and the second electric motor and, the cavity is in fluid communication with the second cavity via a communication line. In still a further detailed embodiment, the act of changing the pressure of the gas in communication with the liquid lubricant includes applying suction to the reservoir.

BRIEF DESCRIPTION OF THE DRAWINGS

FIG. 9 is a schematic diagram showing the level of lubricant within the exemplary axle tube of FIG. 1 prior to start-up.

FIG. 11 is a schematic diagram showing the level of lubricant within the exemplary axle tube of FIG. 1 subsequent to start-up after the air pressure within the subsections is great enough to displace a greater amount of lubricant into a reserve cavity.

DETAILED DESCRIPTION

The exemplary embodiments of the present disclosure are described and illustrated below to encompass axle tubes and methods of managing fluid levels within an axle tube. Of course, it will be apparent to those of ordinary skill in the art that the exemplary embodiments discussed below are merely examples and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present invention.

Figure 1:
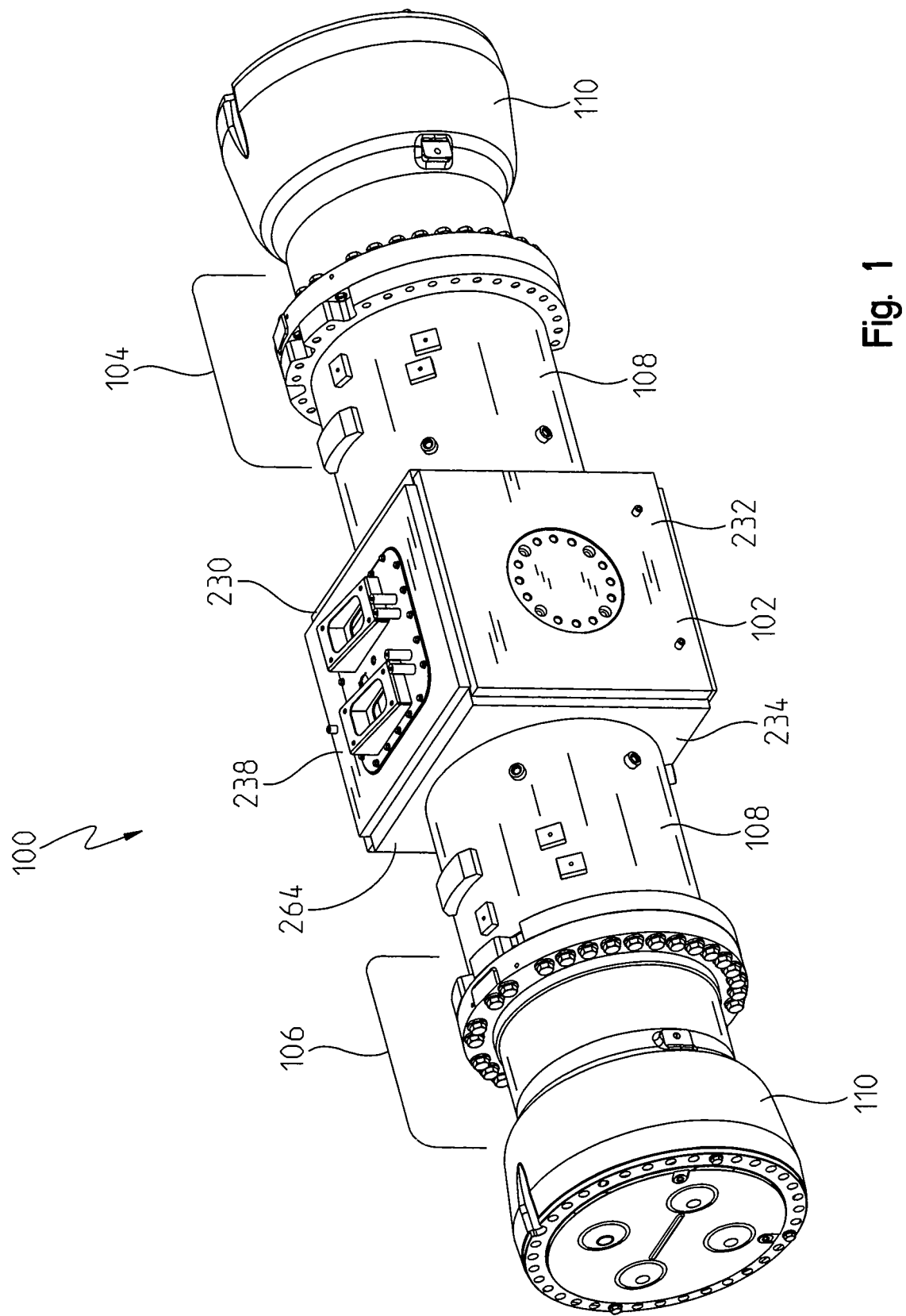
FIG. 1 is an elevated perspective view, from the top, of an exemplary axle tube in accordance with the instant disclosure, shown without external fluid and electrical lines.
Figure 2:
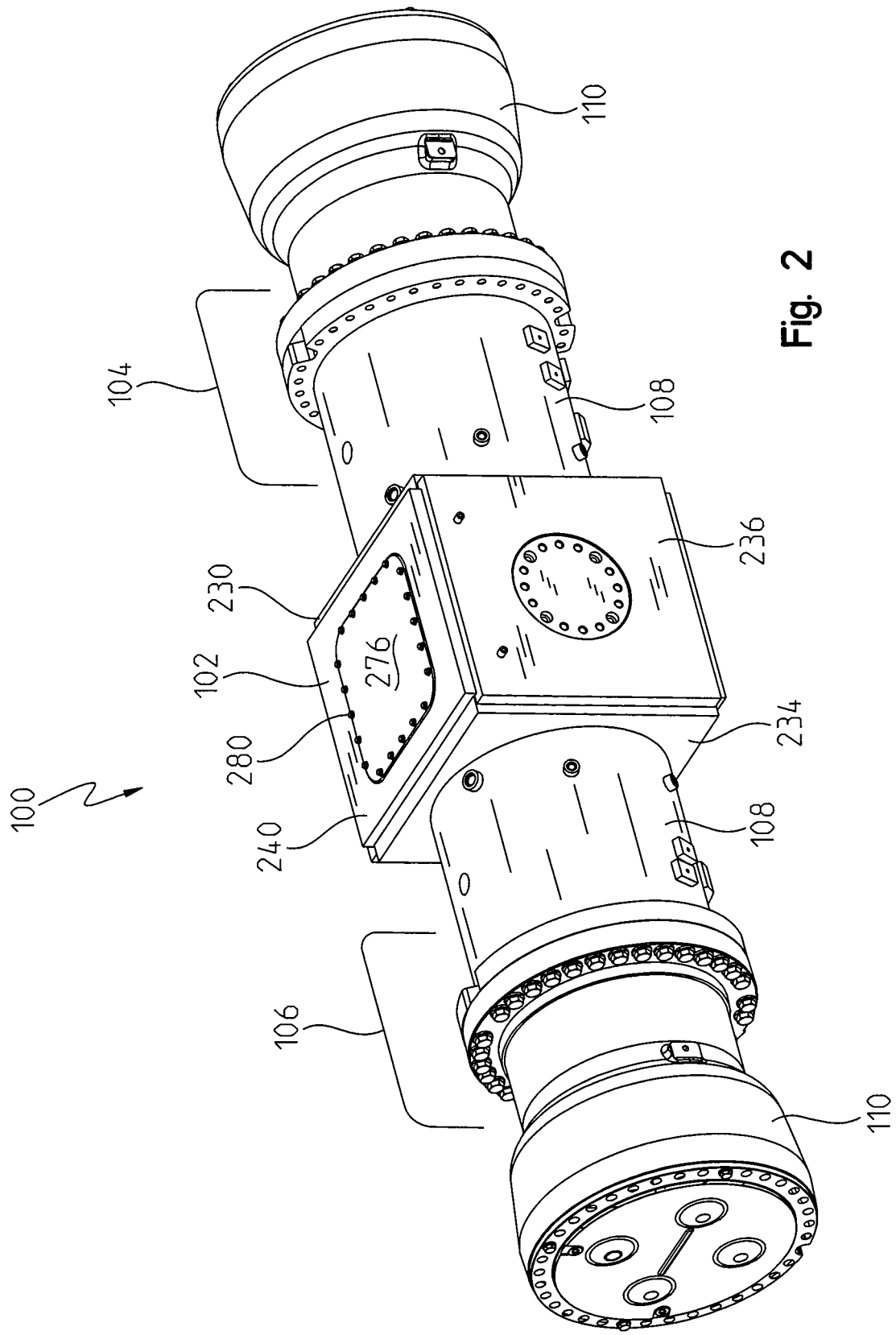
FIG. 2 is an elevated perspective view, from the bottom, of the exemplary axle tube in FIG. 1.
Figure 3:
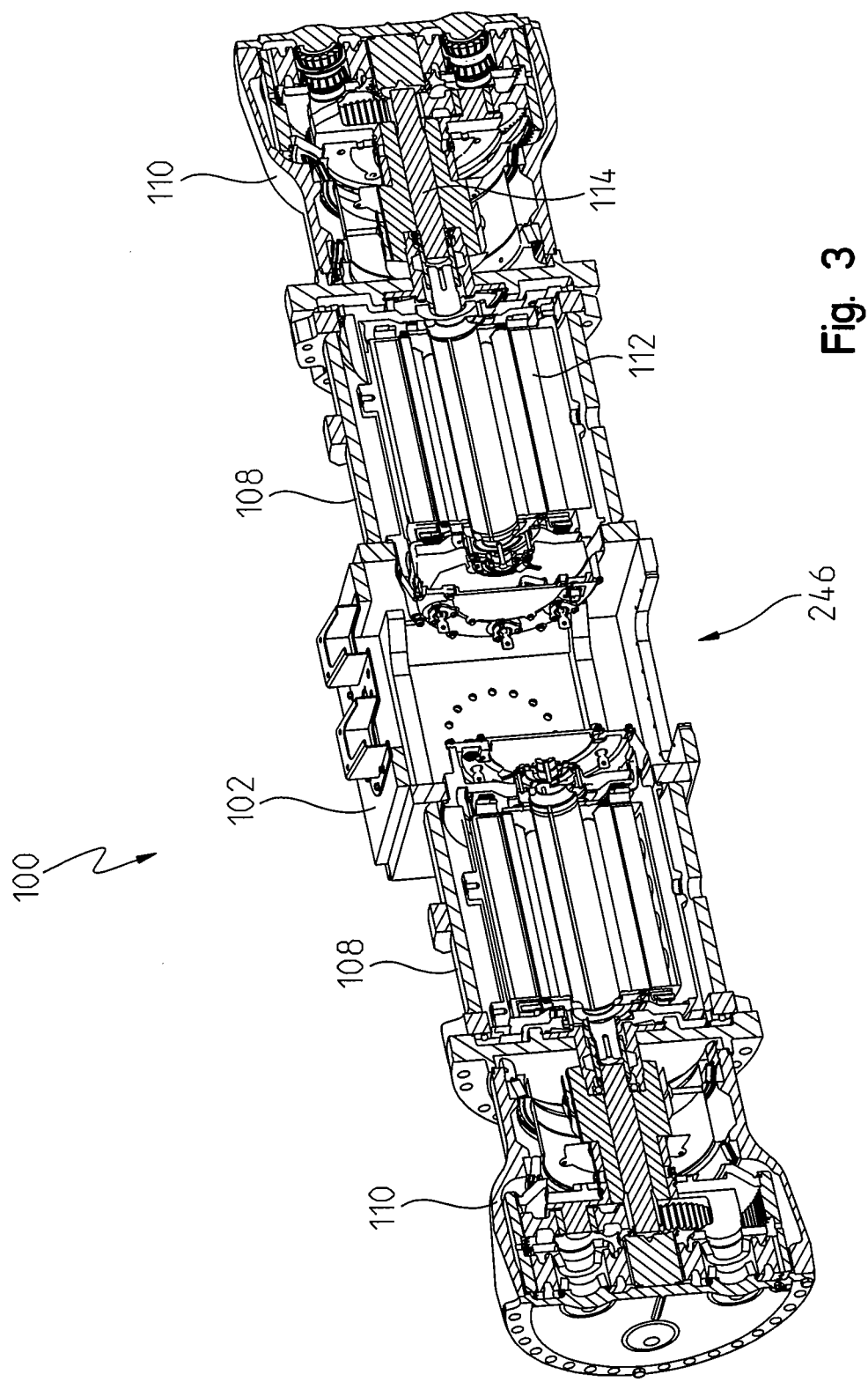
FIG. 3 is a cross-sectional view of the exemplary axle tube in FIG. 1.
Figure 4:
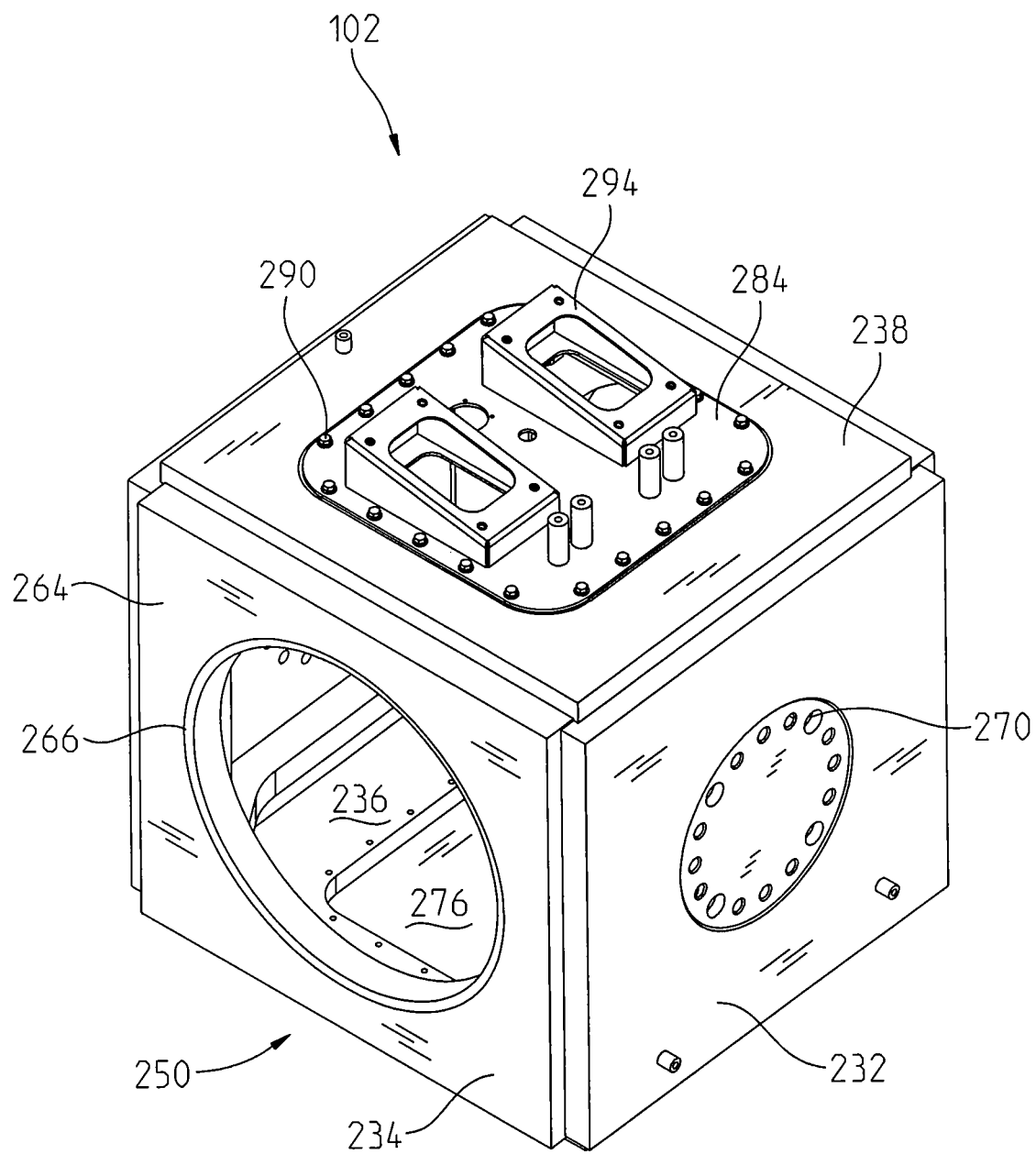
FIG. 4 is an elevated perspective view, from the top, of the exemplary dry center section of FIG. 1.
Figure 5:
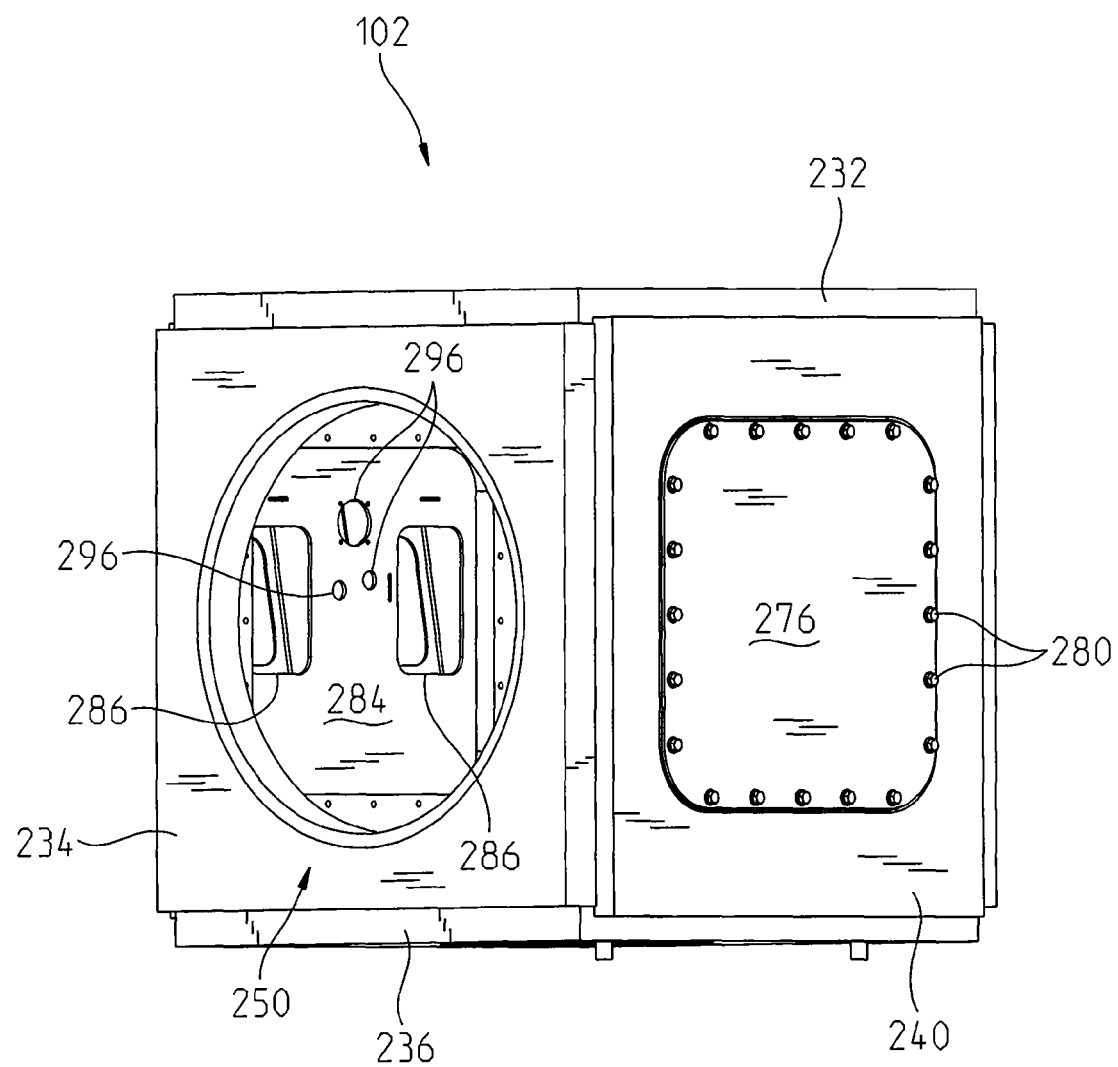
FIG. 5 is an elevated perspective view, from the bottom, of the exemplary dry center section of FIG. 4.
Figure 6:
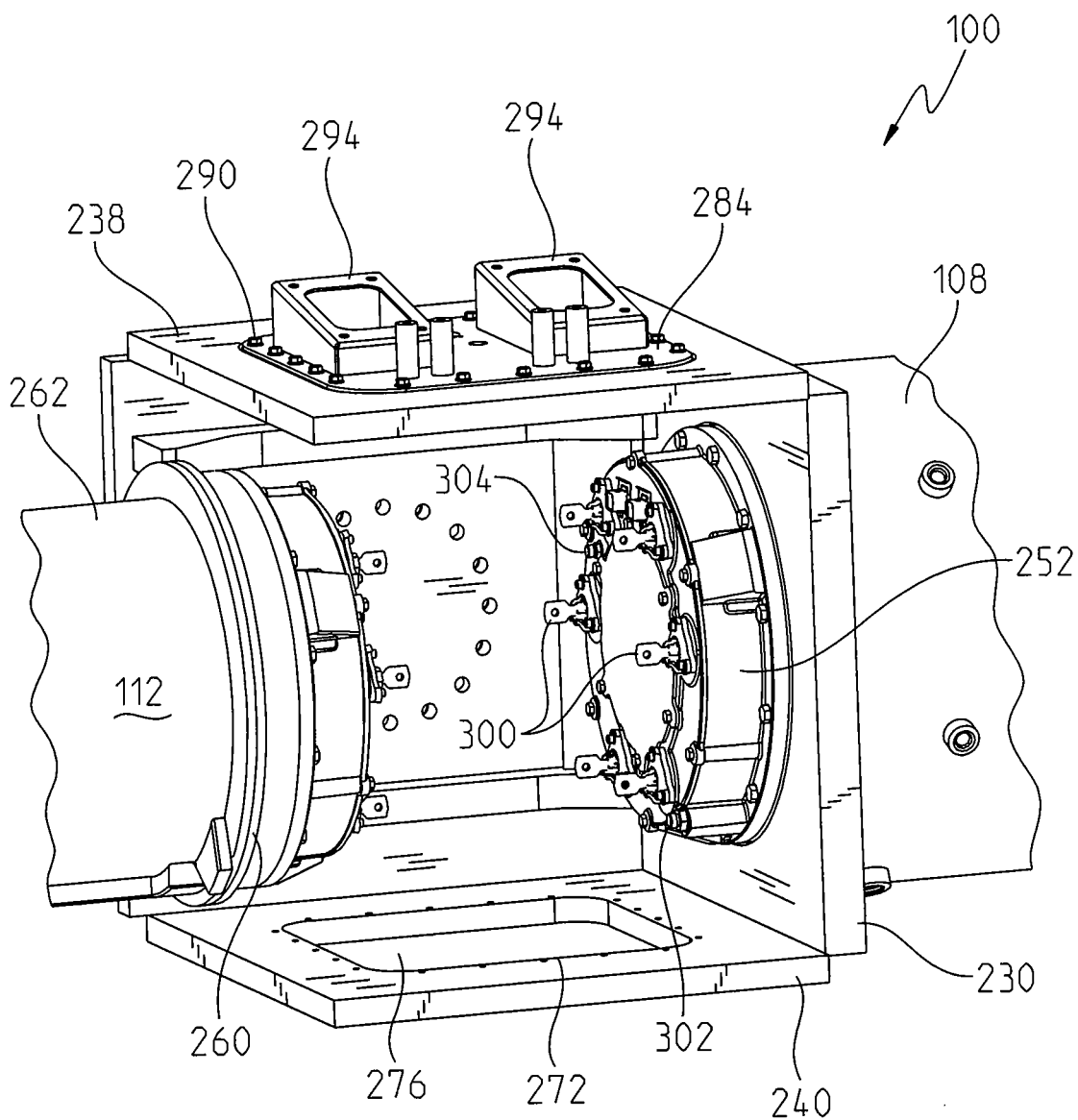
FIG. 6 is an elevated perspective view, from the front, of the exemplary dry center section of FIG. 1 without a pair of walls and showing the pair of electric motors mounted to the dry center section.

Referencing FIGS. 1-3, a first exemplary axle tube 100 (shown without external fluid hoses) includes a dry center section 102 and corresponding right and left wet sections 104, 106 mounted to opposing ends of the dry center section. In this exemplary embodiment, each right and left wet section 104, 106 includes two subsections 108, 110. The first subsection 108 is a motor subsection that houses the majority of an electric motor 112. The second subsection 110 is a transmission subsection and includes transmission components 114 operatively coupled to the electric motor 112. Both the right and left wet sections 104, 106 are sealed in order to retain oil concurrently lubricating and cooling the transmission components 114 and cooling the electric motor 112. Both of the wet sections 104, 106 include seals that are operative to retard the inflow of water and other contaminants.

Referring to FIGS. 1-6, the dry center section 102 comprises an enclosure formed by six rectangular walls 230, 232, 234, 236, 238, 240 that are mounted to one another. Each of the six walls 230, 232, 234, 236, 238, 240 corresponds to another of the remaining five walls so that corresponding pairs of walls are generally uniformly spaced apart and oriented in parallel. This orientation provides a box-shaped enclosure that defines a dry interior cavity 246.

The first corresponding pair of walls 230, 234 (right and left) each include a circular through hole 250 large enough to receive a dry portion 252 of an electric motor 112. As will be discussed in more detail hereafter, the vast majority of the electric motor 112 is housed within the motor subsection 108. Respective elastomeric ring seals 260 interposes an outer housing 262 of each electric motor 112 and an outside surface 264 of each wall 230, 234. In particular, the elastomeric ring seal 260 has a diameter that is greater than the diameter of the through hole 250 so that the ring seal circumscribes the through hole 250, but is mounted to the outside surface 264 of each wall 230, 234. In particular, the outside surface 264 includes a circular recess 266 that bounds the through hole 250 and provides a seat for a portion of the ring seal 260. It should be noted that the housing 262 of each electric motor 112 is concurrently mounted to the seal ring 260, but is not rigidly fastened to the dry center section 102. Rather, the electric motor 112 floats with respect to the dry center section 102 because of the flexibility of the seal rings 260 interposing the walls 230, 234 and the housing 262 of each electric motor 112.

The second corresponding pair of walls 232, 236 (front and back) are coupled to the right and left walls 230, 234 and to the third corresponding pair of walls 238, 240 (top and bottom). Each front and back wall 232, 236 includes a plurality of orifices 270 adapted to provide a mounting location for attaching the axle tube to a vehicle frame (not shown), thereby providing support to the center of the axle tube. The top and bottom walls 238, 240 each include a rounded, rectangular through hole 272. In this exemplary embodiment, the rounded, rectangular through hole 272 of the bottom wall 238 is closed off by a rounded rectangular pan 276 mounted to an exterior surface 278 thereof. In particular, the rounded rectangular pan 276 includes a plurality of orifices (not shown) adapted to receive threaded fasteners 280 that extend through the orifices and into holes of the bottom wall 240 in order to allow the pan to be coupled and uncoupled from the bottom wall. In contrast, the rounded, rectangular through hole 272 of the top wall 238 is not entirely closed off. Instead, a rounded rectangular pan 284 having a pair of elongated rectangular openings 286 is mounted to an outer surface of the top wall 238. As with the bottom pan 276, the top pan 284 includes a plurality of orifices (not shown) adapted to receive threaded fasteners 290 that extend through the orifices and into holes of the top wall 238 to couple and uncouple the top pan from the top wall. Extending from the top pan 284 and circumscribing the elongated rectangular openings 286 are adapter boxes 294. Each adapter box 294 receives a high voltage subassembly (not shown) that is pre-connected and fluidicly sealed in order to establish electrical communication from outside the dry center section 102 and into communication with the electric motors 112 partially located within the dry center section. The adapter boxes 294 also provide connection locations for the air, oil and low voltage lines (not shown) that connect to the electric motors 112. The top pan 284 also includes a plurality of secondary orifices 296 that interpose the adadapter boxes 294.

The dry portion 252 of each electric motor 112 includes numerous connections that provide electrical and fluid communication to the internal components of the electric motor and the transmission components 114. Several electrical connections 300 are provided in order to supply electric current to the internal components. Those skilled in the art are familiar with the structure of electric motors and a corresponding detailed discussion of the internal components of each electric motor has been omitted only to further brevity. In addition to the electrical connections 300, the dry portion 252 also includes an oil supply fitting 302 near the bottom of the dry portion for introducing oil into the interior of the electric motor 112. And an air supply fitting 304 is also provided as part of the dry portion 252 near the top of the dry portion in order to introduce air into the interior of the electric motor 112.

Figure 7:
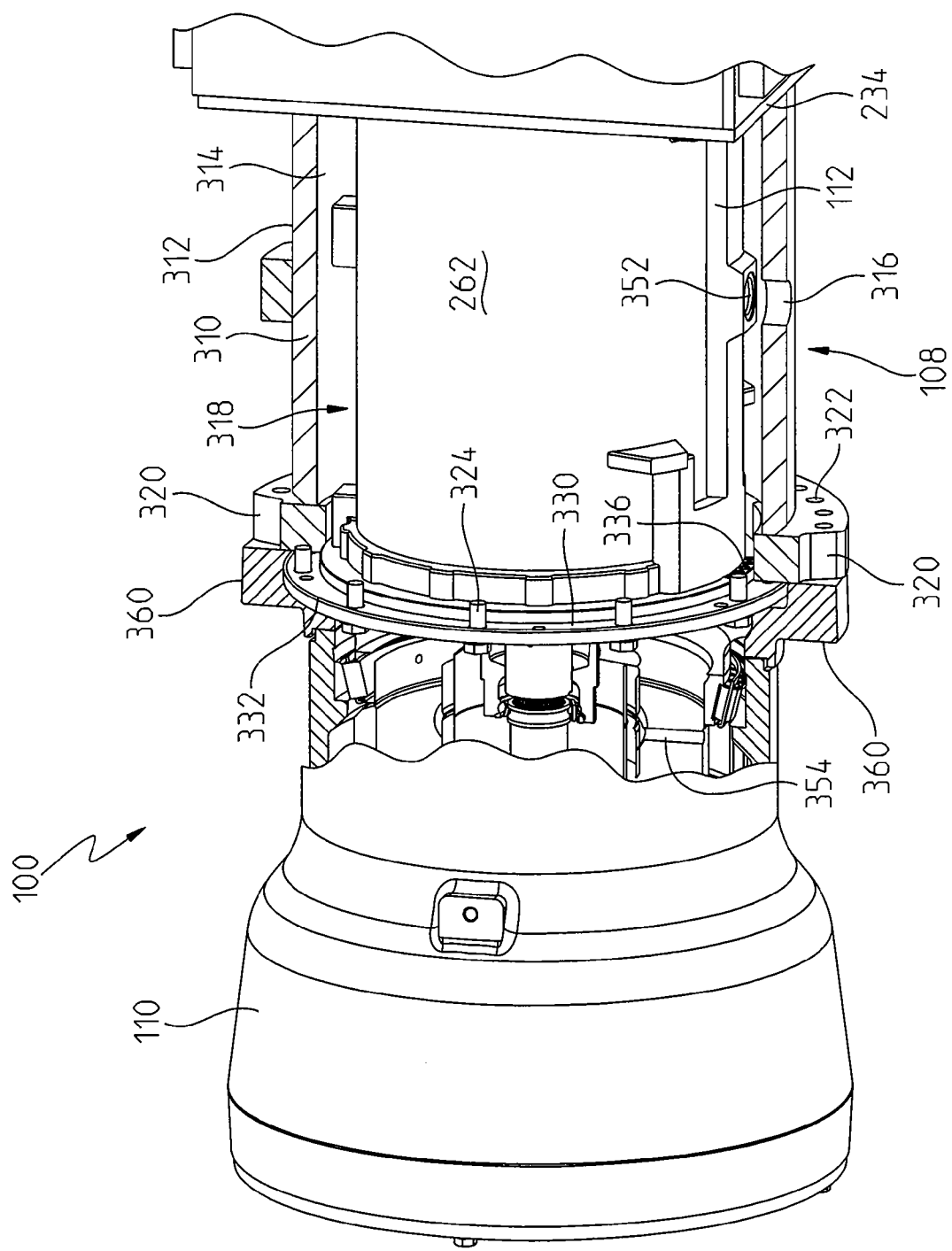
FIG. 7 is an elevated perspective view, taken from the electric motor side, of a cross-section taken with respect to the transmission subsection and the motor subsection housing to show the position of the electric motor with respect to adjacent components.
Figure 12:
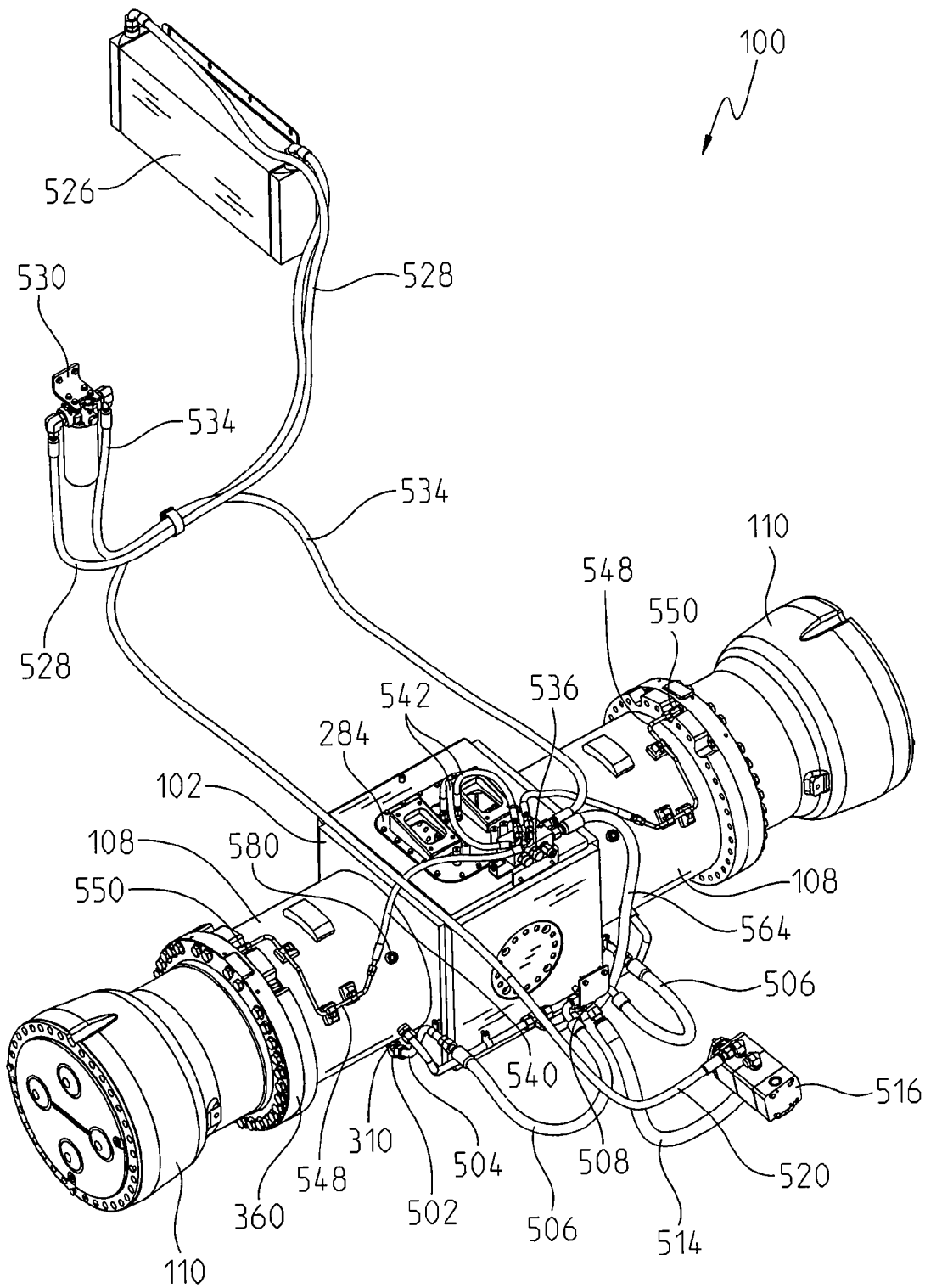
FIG. 12 is an elevated perspective view, from the top, of an exemplary axle tube in accordance with the instant disclosure shown with external fluid lines.
Figure 13:
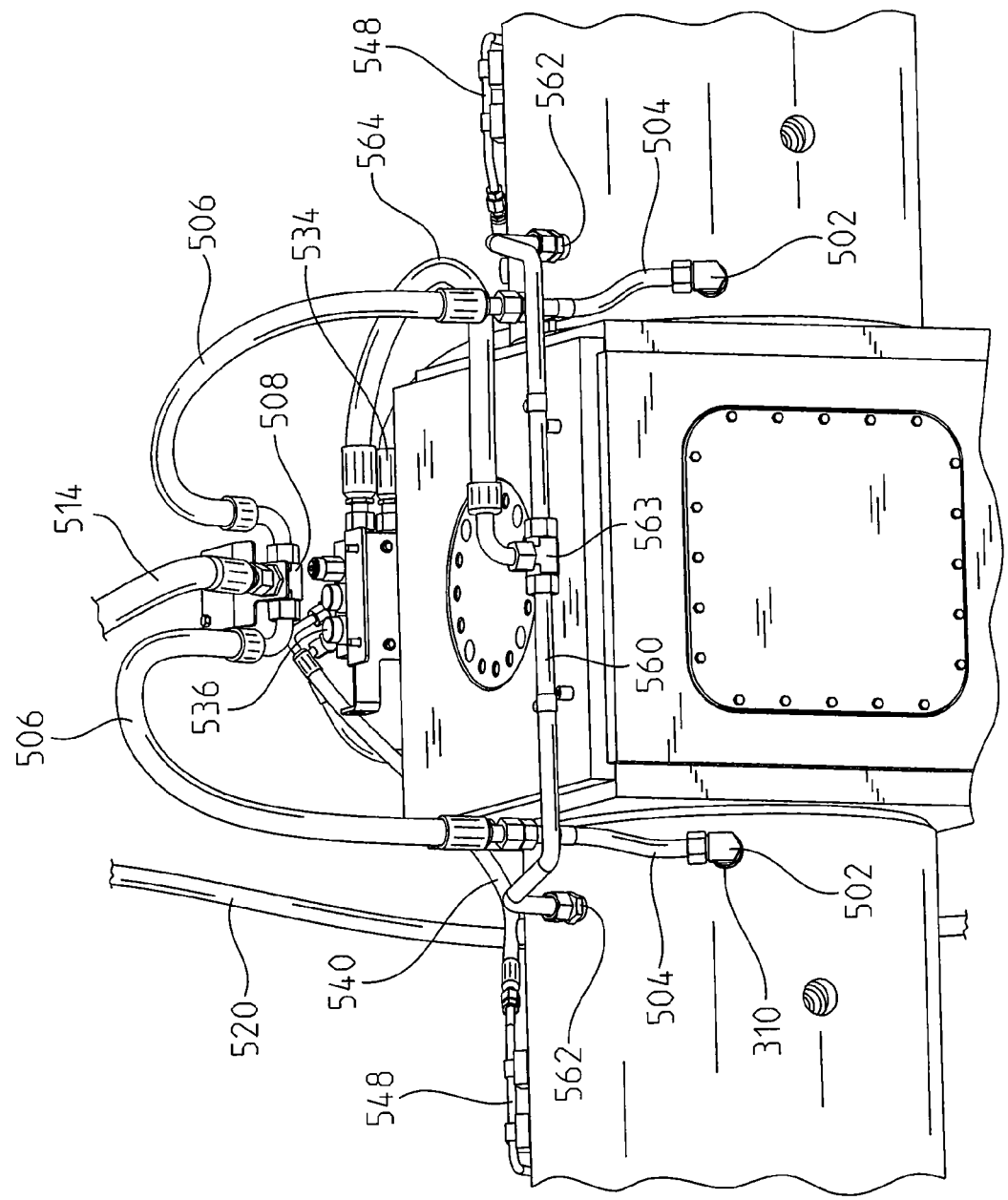
FIG. 13 is a magnified view of a portion of FIG. 12.

Referring to FIGS. 1 and 7, the remainder of the electric motor 112 is housed within a tube 310 of the motor subsection 108. The tube 310 comprises a dual ply 312, 314 cylinder having a series of fluid connections 316 that allow for fluid communication between the interior of the tube and an exterior of the tube. As will be discussed in more detail hereafter, the fluid connections 316 are coupled to hoses (see FIGS. 12 and 13). In between the interior ply 314 of the tube 310 and the exterior of the electric motor housing 262 is a reserve cavity 318 that is used to store excess oil when the axle tube 100 is in operation. Both tube 310 plies 312, 314 are welded at one longitudinal end to the outside surface 264 of respective walls 230, 234.

Figure 8:
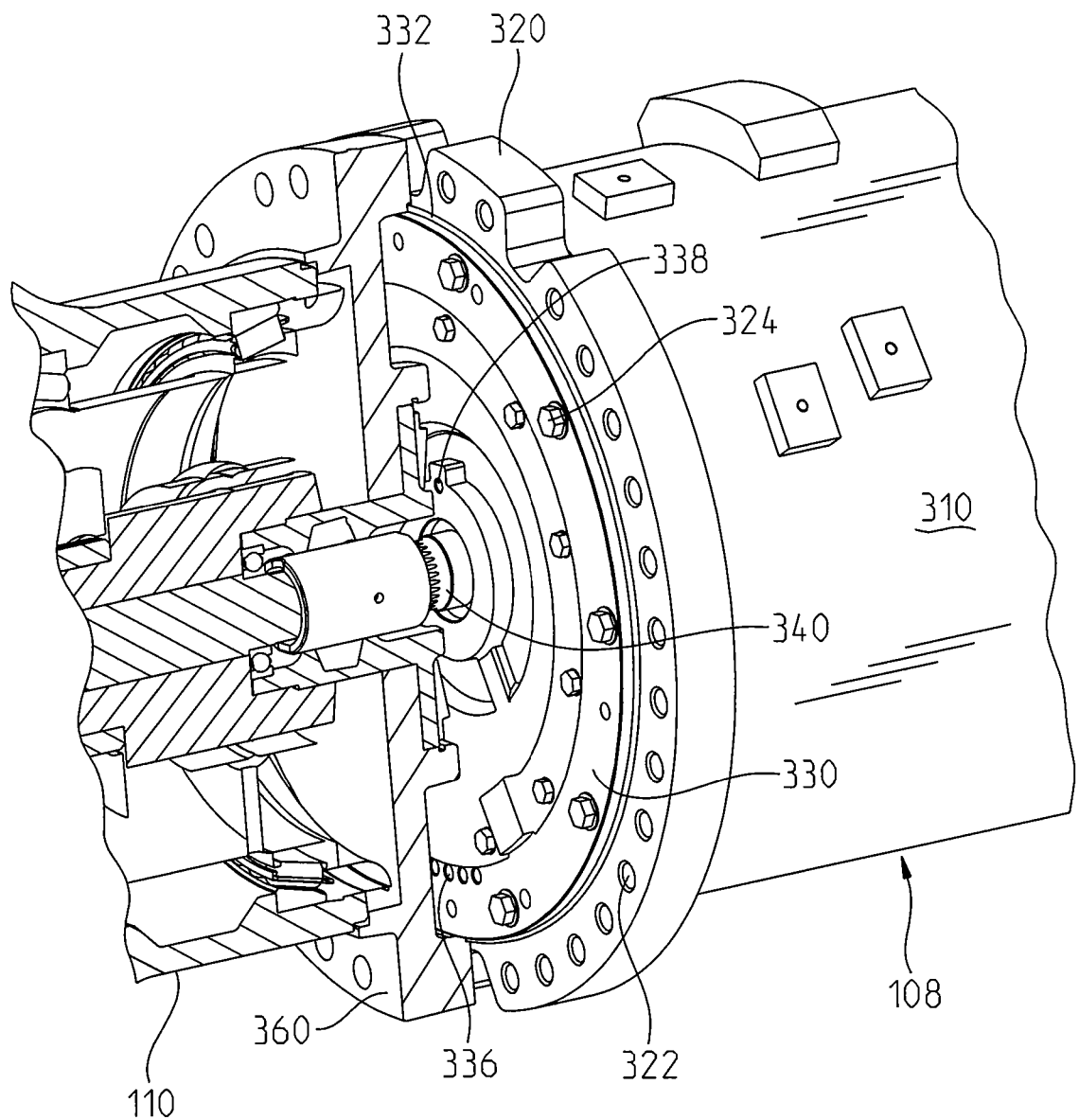
FIG. 8 is an elevated perspective view, taken from the transmission side, of a cross-section taken with respect to the transmission subsection to show the position of the electric motor and tube with respect to adjacent components.

Referencing FIGS. 7 and 8, the opposite longitudinal end of each tube 310 is welded to a circular flange 320 having a plurality of through holes. A first circumferentially outermost set of holes 322 receive fasteners in order to mount the flange 320 to a corresponding flange 360 of the transmission subsection 110. A second inner circumferential set of holes (not shown) receive fasteners 324 in order to mount the flange 320 to an end plate 330 of the electric motor 112. A gasket 332 interposes the flange 320 and the end plate 330 to ensure a fluid tight seal therebetween.

The end plate 330 includes several holes having varying functionality. A first set of holes receive the fasteners 324 in order to mount the electric motor 112 to the flange 320. A second set of through holes 336 provide communication across the end plate 330. As will be discussed in more detail hereafter, these holes 336 provide a pathway for fluid (e.g., coolant/lubricant, such as oil) to flow between the interior of the transmission subsection 110 and the reserve cavity 318. In order to manipulate the flow of fluid between the interior of the transmission subsection 110 and the reserve cavity 318, the end plate 330 also includes a through hole 338 elevated above an output shaft 340 from the electric motor 112 and above the second set of through holes 336. The through hole 338 is adapted to provide a pathway for fluid (e.g., air) to flow between the interior of the transmission subsection 110 and the electric motor housing 262. In this manner, as air pressurizes the interior of the transmission subsection 110 and the interior of the electric motor housing 262, coolant/lubricant is forced into the reserve cavity 318.

Figures 10A, 10B:
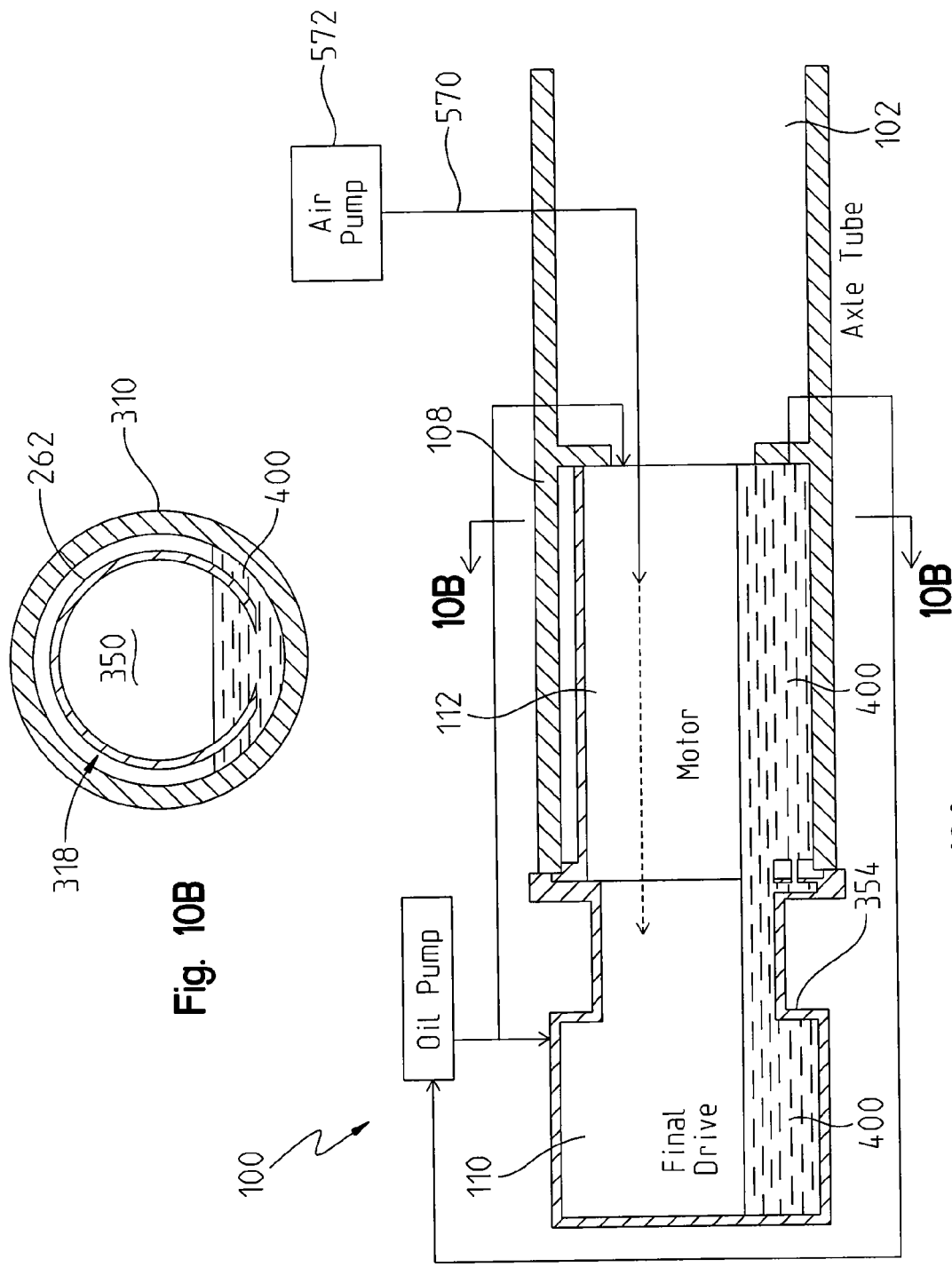
FIG. 10 is a schematic diagram showing the level of lubricant within the exemplary axle tube of FIG. 1 at start-up.

Referring to FIGS. 9-11, a schematic diagram shows the transmission subsection 110 and the motor subsection 108 coupled to one another and fluidicly sealed. In this manner, lubricant/coolant (e.g., oil) 400 is able to flow between the subsections 108, 110, but the subsections generally maintain the same aggregate volume (subsection 108 plus subsection 110) of lubricant/coolant. And the amount of lubricant/coolant 400 located within either subsection 108, 110 changes depending upon whether the axle tube 100 is operable or not.

Referencing FIGS. (7-9), initially, as the axle tube 100 becomes operable (upon receiving electric current to drive the electric motors 112 and an air supply, and upon being on level ground), the level of lubricant/coolant 400 within the subsections 108, 110 is generally the same. This universal level is the result of lubricant/coolant 400 freely flowing between the subsections through the second set of through holes 336 of the end plate 330 (see FIGS. 7 and 8). More specifically, the level of lubricant/coolant 400 is the same in the transmission subsection 110, the reserve cavity 318, and in the internal cavity 350 of the electric motor 112. But this universal level does not stay the same during operation of the axle tube 100.

Figure 14:
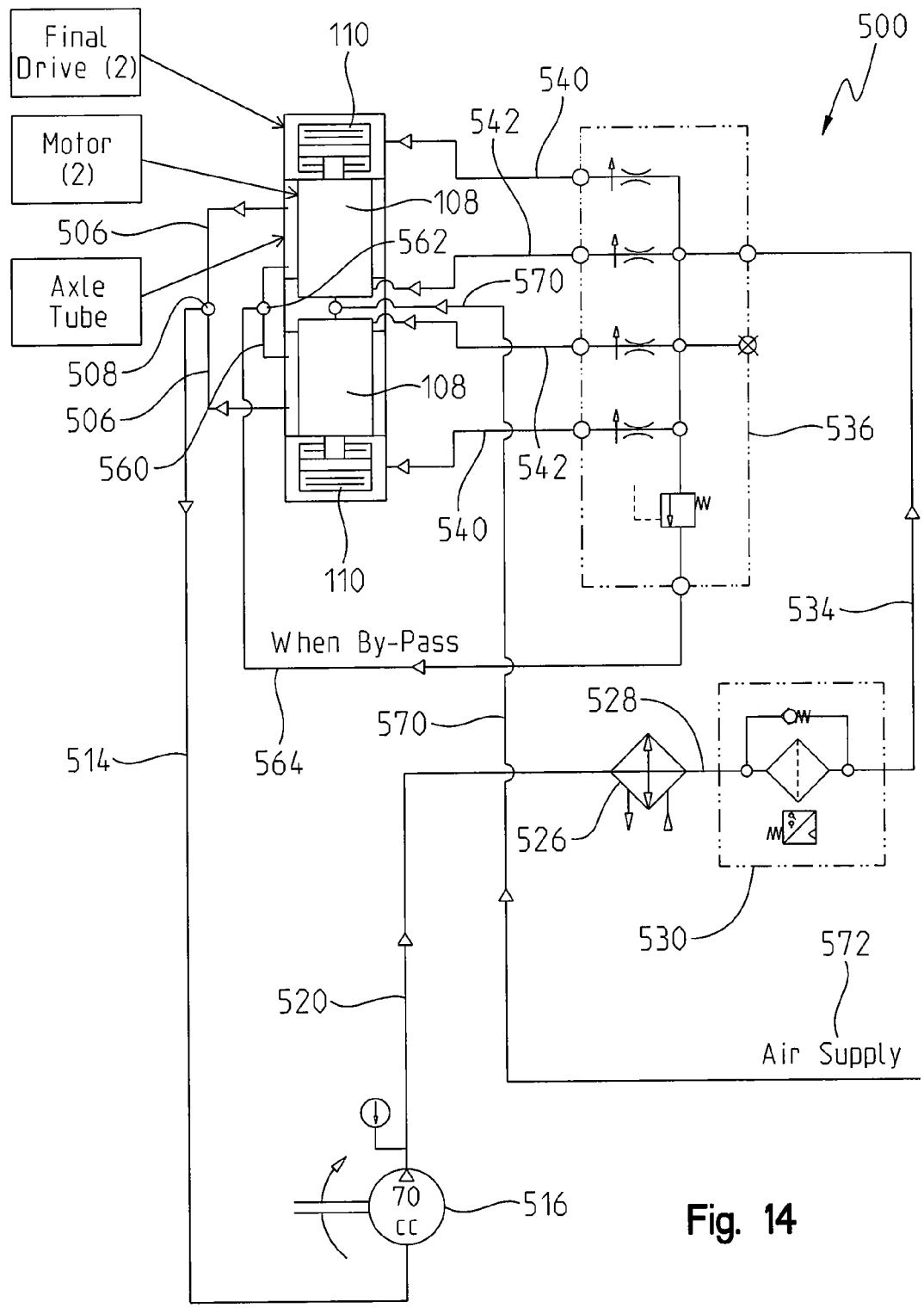
FIG. 14 is an exemplary flow diagram for the axle tube shown in FIG. 12.

Referring to FIGS. 6-8 and 10, after the axle tube 100 becomes operable (upon receiving electric current to drive the electric motors 112 and an air supply (e.g., air source 572 in FIG. 14), and upon being on level ground), air is fed into the internal cavity 350 of the electric motor 112 by way of the air supply fitting 304 within the dry portion 252. The air within the internal cavity 350 of the electric motor 112 builds in pressure based upon the air supply providing air above atmospheric pressure. In exemplary form, the air supply provides air at approximately forty pounds per square inch gauge (psig), which is reduced before it reaches the air supply fitting 304. The air pressure within the electric motor 112 may be, for example, between 0.4-1.0 psig to overcome the head pressure within the reserve cavity 318 and force oil out of the interior of the electric motor through a drain 352 at the base of the electric motor housing 262. Eventually, as the air drives out all or almost all of the lubricant 400 within the interior 350 of the electric motor 112, air begins to escape through the drain 352 and into the reserve cavity 318, where it is vented via a vent 580. In this manner, the air pressure within the interior 350 of the electric motor 112 may be self-regulated. In addition, as the air pressure builds within the internal cavity 250, the air escapes through the through hole 338 of the end plate 330 that is elevated above the output shaft 340. Thus, the air pressure across the through hole 338 is relatively the same. This means that the air pressure within the internal cavity 350 of the electric motor 112 is the same as the air pressure within the transmission subsection 110. Because of this equalization of pressure, the level of lubricant/coolant 400 across the through holes 336 is generally the same in the transmission subsection 110 and in the internal cavity 350 of the electric motor 112. But it should also be noted that the transmission subsection 110 includes a retainer wall 354 operative to retain a predetermined level of lubricant 400 within a portion of the transmission subsection that is above the level of lubricant across the through holes 336. And the level of lubricant within the reserve cavity 318 is also higher than the level of lubricant across the through holes 336.

Referencing FIG. 11, as the air pressure builds within the transmission subsection 110 and the internal cavity 350 of the electric motor 112, the higher pressure air begins to displace the lubricant/coolant 400 within these areas. As air displaces the lubricant/coolant 400, the corresponding level of lubricant/coolant 400 within the transmission subsection 110 and the internal cavity 350 drops and the lubricant/coolant is forced into the reserve cavity 318, thus causing the level of lubricant/coolant to drastically increase—well above the level within the transmission subsection and the internal cavity 350 of the electric motor 112. Eventually, the level of lubricant/coolant 400 within the transmission subsection 110 and the internal cavity 350 reaches an operating level as an equilibrium is established between the air pressure pushing on the lubricant/coolant and the pressure of the lubricant/coolant pushing back on the air. This operating level of lubricant/coolant 400 is determined, in large part, based upon the operating pressure of the air supply. However, those skilled in the art will realize that the operating level of lubricant/coolant 400 may change and, thus, the air pressure supplied by the air supply may also change to accommodate for these changes in the operating level of the lubricant/coolant.

When the axle tube 100 no longer is operable (not electric current to drive the electric motors 112 and no air supply, and upon being on level ground), the level of lubricant/coolant 400 within the subsections 108, 110 returns to being uniform (see FIG. 9). Specifically, without the air pressure forcing the lubricant/coolant 400 into the reserve cavity 318, the pressure of the lubricant/coolant within the reserve cavity operates to displace the air and become evenly distributed among the subsections 108, 110.

Referencing FIGS. 11-14, the lubricant/coolant 400 flows through a closed loop 500 that includes the interior of the subsections 108, 110 and a series of interconnected conduits. Each tube 310 includes an exit orifice defined by an exit orifice fitting 502 that is positioned near the lowest arcuate location on the tube. The exit orifice fitting 502 is mounted to a rigid outlet conduit 504 that is mounted to a flexible outlet conduit 506. In this way, the fitting 502 and conduits 504, 506 cooperate provide sealed flow for lubricant/coolant 400 exiting the reserve cavity 318 and flowing to the end of the outlet conduit 506. Each end of both flexible outlet conduits 506 is coupled to a T-fitting 508 operative to consolidate the dual flows into a single flexible line 514. This flexible line 514 is operatively coupled to a pump 516 that forces the lubricant/coolant 400 into a discharge flexible conduit 520 that carries the lubricant/coolant to be cooled and cleaned.

Lubricant/coolant 400 is carried by the flexible conduit 520 and directed into a radiator 526, which has a second fluid flowing therethrough to lower the temperature of the lubricant/coolant. After the lubricant/coolant 400 has been cooled, a radiator outlet conduit 528 conveys the lubricant/coolant to a filter 530. The filter 530 is operative to remove contaminants from the lubricant/coolant 400 and discharge clean lubricant/coolant into a feed conduit 534.

The feed conduit 534 is coupled to a manifold 536 that operates to distribute the lubricant/coolant 400 among several input conduits 540, 542. The first pair of input conduits 540 are each coupled to a rigid conduit 548 that is coupled to an entrance orifice fitting 550 that defines an entrance orifice. The entrance orifice fitting 550 is mounted to the flange 360 of the transmission subsection 110 and provides an egress point for lubricant/coolant 400 to flow into the interior of the transmission subsection. The second pair of input conduits 542 extends through the secondary orifices 296 (see FIG. 5) of the top pan 284 and into communication with the oil supply fitting 302 of the electric motor 112 (see FIG. 6), thereby providing an egress point for lubricant/coolant 400 to flow into the interior of the electric motor.

Direct fluid communication between the motor subsections 108 is made possible by a communication line 560 that is coupled to respective outlet fittings 562 mounted to the tube 310 at locations elevated with respect to the exit orifice fittings 502. In this manner, lubricant/coolant 400 is freely able to flow between one reserve cavity 318 (see FIG. 7) to the other reserve cavity. The communication line 560 comprises two mirror image sections of rigid line (that generally retains its shape) that are coupled to a box fitting 563. The box fitting 563 is coupled to a by-pass conduit 564 that is also coupled to the manifold 536. In this manner, if the input conduits 540, 542 become damaged or blocked, the manifold recognizes the resulting pressure difference (greater or lesser) and diverts the lubricant/coolant 400 from the manifold 536 into the by-pass conduit 564, where the lubricant/coolant is directed into the respective reserve cavities 318 using the communication line 560. Otherwise, the by-pass conduit 564 contains stagnant lubricant/coolant 400. And, as shown in part in FIGS. 10 and 11, an air supply conduit 570 provides air from an air source 572 to the air supply fitting 304 of the electric motor 112. Exemplary air sources include, without limitation, turbochargers and air compressors. In this exemplary embodiment, it is envisioned that the axle tube 100 is included as part of a larger machine having an internal combustion engine with a turbocharger, where at least a portion of the discharged, compressed air from the turbocharger is routed through the air supply conduit 570. It should also be noted that the tube 310 includes a vent 580 that may be operatively coupled to a vent line (not shown) in order to vent air within the reserve cavity 318 as the amount of lubricant/coolant 400 increases, and at the same time allow air into the reserve cavity as the amount of lubricant/coolant decreases.

Figure 15:
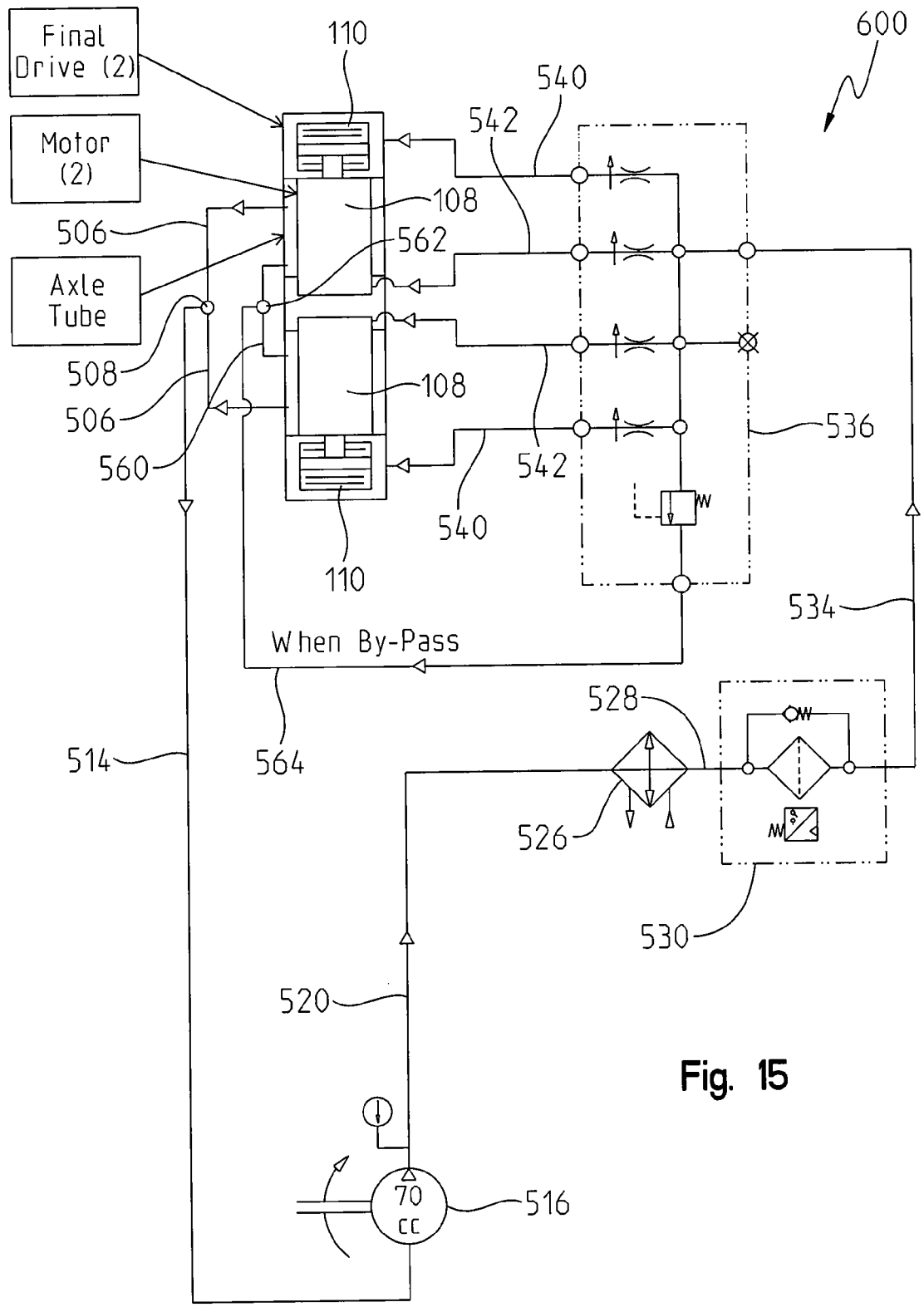
FIG. 15 is an exemplary flow diagram for an alternate exemplary axle tube.
Figure 16:
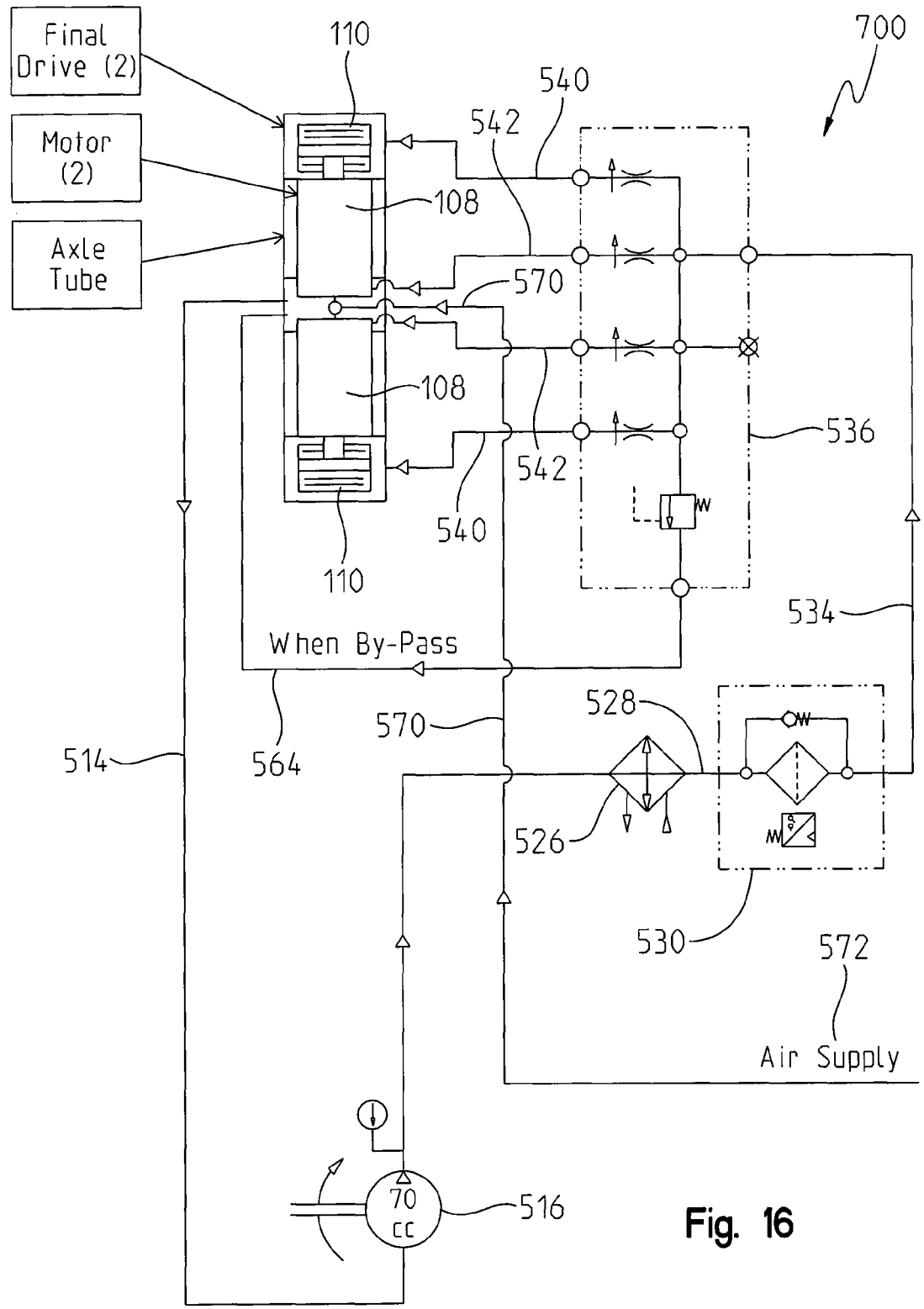
FIG. 16 is another exemplary flow diagram for yet another alternate exemplary axle tube.

Referring to FIGS. 15 and 16, an additional set of schematic diagrams depict alternate closed loop flow paths 600, 700 for the lubricant/coolant 400. In this first alternate closed loop 600, the conduits and components are the same as the first closed loop 500 with the exception of providing an air source 572 or an air supply conduit 570. In such a circumstance, the lubricant/coolant 400 within the subsections 108, 110 is not actively managed to direct more lubricant/coolant to the reserve cavities 318 when the electric motor 112 and transmission components are operational.

The second alternate closed loop 700 includes the conduits and components of the first closed loop 500 with the exception of omitting the dry center section 102 and the communication line 560. In this manner, lubricant/coolant 400 is fed directly into the motor subsection 108 and pulled directly from the motor subsection. Likewise, the air supply conduit is split and coupled directly to each motor subsection 108. In this alternate embodiment, because the dry center section 102 is absent, the lubricant/coolant 400 conduits, electrical lines to the electric motors, and air supply line needs to able to withstand partial or total submerging in the lubricant/coolant.

It should be noted that while the foregoing embodiment have discussed using compressed air to increase the level of lubricant/coolant 400 within the reserve cavity 318, it is also within the scope of the disclosure to apply suction to the top of the reserve cavity to pull additional lubricant/coolant within the reserve cavity. In such a circumstance, the vent 580 may be couple to a suction line (not shown) that operates to create a low pressure area within the reserve cavity 318 to raise the level of lubricant/coolant 400.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. An axle tube comprising:
a transmission subsection housing a transmission;
an electric motor having an outer housing, the electric motor at least partially encompassed by a motor tube to comprise a motor subsection, the outer housing having a drain orifice; and,
a liquid cavity cooperatively delineated by the outer housing and the motor tube;
wherein the liquid cavity and an interior of the electric motor are in fluid communication via the drain orifice;
wherein the transmission subsection and the motor subsection are mounted to one another;
wherein the transmission subsection fluidicly communicates with the interior of the electric motor through a first orifice;
wherein the transmission subsection fluidicly communicates with the interior of the electric motor and liquid cavity through a second orifice; and,
wherein the first orifice is elevated above the second orifice.

2. The axle tube of claim 1, wherein:
the electric motor includes an air inlet orifice in communication with the interior of the electric motor; and, the motor subsection includes a lubricant inlet orifice in communication with an interior of the motor subsection.

3. The axle tube of claim 1, wherein:

at least one of the transmission subsection and the motor subsection includes a drain orifice in fluid communication with a pump by way of a first conduit to draw out liquid; and, at least one of the transmission subsection and the motor subsection includes a liquid inlet orifice in fluid communication with the pump by way of a second conduit to deliver liquid to at least one of the transmission subsection and the motor subsection.

4. The axle tube of claim 3, wherein:

the second conduit is in fluid communication with an in-line liquid filter; and, the second conduit is in fluid communication with an in-line liquid radiator.

5. The axle tube of claim 4, wherein:

the second conduit is in fluid communication with a liquid manifold;

the liquid manifold divides the second conduit into a first inlet line and a second inlet line;

the first inlet line is in fluid communication with an interior of the transmission subsection; and, the second inlet line is in fluid communication with an interior of the motor subsection.

6. The axle tube of claim 1, wherein the motor subsection includes an end plate having an opening through which a motor shaft of the electric motor extends into the transmission subsection, the end plate including the first orifice and the second orifice, the first orifice is located above the opening and the second orifice is located below the opening.

7. An axle tube comprising:

a right side transmission subsection housing a right side transmission;

a left side transmission subsection housing a left side transmission;

a right side electric motor having a right side outer housing, the right side electric motor at least partially encompassed by a motor tube to comprise a motor subsection, the right side outer housing having a first drain orifice;

a left side electric motor having a left side outer housing, the left side electric motor at least partially encompassed by the motor tube to comprise part of the motor subsection, the left side outer housing having a second drain orifice; and, a liquid cavity cooperatively delineated by the right side outer housing, the left side outer housing, and the motor tube;

wherein the liquid cavity and an interior of the right side electric motor are in fluid communication via the first drain orifice;

wherein the liquid cavity and an interior of the left side electric motor are in fluid communication via the second drain orifice;

wherein the right side transmission subsection and the motor subsection are mounted to one another;

wherein the left side transmission subsection and the motor subsection are mounted to one another;

wherein the right side transmission subsection fluidicly communicates with the interior of the right side electric motor through a first opening;

wherein the right side transmission subsection fluidicly communicates with the interior of the right side electric motor and the liquid cavity through a second opening;

wherein the left side transmission subsection fluidicly communicates with the interior of the left side electric motor through a third opening;

wherein the left side transmission subsection fluidicly communicates with the interior of the left side electric motor and the liquid cavity through a fourth opening; and, wherein the first and third openings are respectively elevated above the second and fourth openings.

8. The axle tube of claim 7, wherein:

the right side electric motor includes an air inlet orifice in communication with the interior of the right side electric motor;

the right side motor subsection includes a lubricant inlet orifice in communication with an interior of the right side motor subsection;

the left side electric motor includes an air inlet orifice in communication with the interior of the left side electric motor; and, the left side motor subsection includes a lubricant inlet orifice in communication with an interior of the left side motor subsection.

9. The axle tube of claim 7, wherein:

the right side motor subsection includes an end plate having an opening through which a motor shaft of the right side electric motor extends into the right side transmission subsection, the end plate including the first orifice and the second orifice, the first orifice is located above the opening and the second orifice is located below the opening; and, the left side motor subsection includes an end plate having an opening through which a motor shaft of the left side electric motor extends into the left side transmission subsection, the end plate including the third orifice and the fourth orifice, the third orifice is located above the opening and the fourth orifice is located below the opening.

10. A method of controlling fluid levels within an axle tube, the method comprising:

establishing a first predetermined level of a liquid lubricant within a transmission and an electric motor operatively coupled to the electric motor, the axle tube housing the electric motor and the transmission, where a cavity interposing a wall of the axle tube and the electric motor is occupied by the liquid lubricant at a second predetermined level; and, lowering the first predetermined level of the liquid lubricant within the electric motor and the transmission by changing a gas pressure exerted upon the liquid lubricant;

wherein changing the gas pressure exerted upon the liquid lubricant within the axle tube raises the second predetermined level of liquid lubricant within the cavity.

11. The method of claim 10, wherein the act of changing the gas pressure exerted upon the liquid lubricant includes forcing compressed air into the axle tube, the compressed air coming from a discharge of a turbocharger.

12. The method of claim 10, wherein the act of changing the gas pressure exerted upon the liquid lubricant includes forcing air into the axle tube using an air compressor.

13. The method of claim 10, wherein the act of changing the gas pressure exerted upon the liquid lubricant includes applying suction to the cavity.

14. The method of claim 10, wherein the first predetermined level of the liquid lubricant is different within the transmission and the electric motor.

15. The method of claim 10, wherein
the transmission and an interior of the electric motor are in gaseous communication with one another through a first opening;
the transmission and the cavity are in liquid communication with one another through a second opening; and,
the first predetermined level of the liquid lubricant within the electric motor prohibits gaseous communication between the interior of the transmission and the cavity.

16. A method of distributing a liquid lubricant within an axle tube, the method comprising:
using a cavity interposing an electric motor and a wall of the axle tube as a liquid lubricant reservoir, where the axle tube houses the electric motor and a transmission; and,
varying the amount of the liquid lubricant within the reservoir by changing a pressure of a gas in communication with the liquid lubricant in the axle tube.

17. The method of claim 16, further comprising:
providing a predetermined amount of the liquid lubricant within the axle tube;
maintaining the predetermined amount of the liquid lubricant within the axle tube; and,
dropping a level of the liquid lubricant in at least one of the electric motor and the transmission;
wherein varying the amount of the liquid lubricant within the reservoir does not change the predetermined amount of the liquid lubricant within the axle tube.

18. The method of claim 16, wherein:
the axle tube includes a second cavity interposing a second electric motor and the wall of the axle tube as a second liquid lubricant reservoir; and,
the axle tube houses the second electric motor and a second transmission.

19. The method of claim 18, wherein:
the axle tube includes a dry section between the electric motor and the second electric motor; and,
the cavity is in fluid communication with the second cavity via a communication line.

20. The method of claim 16, wherein the act of changing the pressure of the gas in communication with the liquid lubricant includes applying suction to the reservoir.

* * * * *